United States Patent
Krasner et al.

(10) Patent No.: US 10,996,967 B1
(45) Date of Patent: May 4, 2021

(54) PRESENTING VIRTUAL DISKS AS DUAL PORTED DRIVES TO A VIRTUAL STORAGE SYSTEM

(71) Applicant: EMC Corporation, Hopkinton, MA (US)

(72) Inventors: Jonathan Krasner, Coventry, RI (US); Chakib Ouarraoui, Watertown, MA (US); Steven McClure, Northborough, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 447 days.

(21) Appl. No.: 15/191,766

(22) Filed: Jun. 24, 2016

(51) Int. Cl.
*G06F 9/455* (2018.01)
*G06F 3/06* (2006.01)

(52) U.S. Cl.
CPC .......... *G06F 9/45558* (2013.01); *G06F 3/061* (2013.01); *G06F 3/0629* (2013.01); *G06F 3/0664* (2013.01); *G06F 3/0683* (2013.01); *G06F 2009/45583* (2013.01)

(58) Field of Classification Search
CPC ....... G06F 9/45558; G06F 2009/45583; G06F 2009/45579; G06F 2009/45595; G06F 3/0629; G06F 3/0635; G06F 3/0662; G06F 11/2002; G06F 11/2005; G06F 11/2007; G06F 11/201; G06F 11/2017; G06F 11/2053; G06F 11/2056; G06F 11/2058; G06F 11/2071; G06F 11/2084; G06F 11/2087; G06F 11/2089; G06F 11/2092; H04L 4/0803; H04L 4/0813; H04L 4/0836
See application file for complete search history.

(56) References Cited

U.S. PATENT DOCUMENTS

| | | | | |
|---|---|---|---|---|
| 5,269,011 A * | 12/1993 | Yanai | .................. | G06F 15/17 703/24 |
| 5,426,761 A * | 6/1995 | Cord | .................. | G06F 12/0862 711/114 |
| 5,619,644 A * | 4/1997 | Crockett | ............ | G06F 11/0778 714/45 |
| 5,721,898 A * | 2/1998 | Beardsley | ............. | G06F 3/0601 |
| 6,865,648 B1 * | 3/2005 | Naamad | ............. | G06F 12/0804 711/100 |
| 6,983,330 B1 * | 1/2006 | Oliveira | .................. | H04L 69/32 340/2.1 |
| 7,246,187 B1 * | 7/2007 | Ezra | ........................ | G06F 9/526 710/200 |
| 7,581,048 B1 * | 8/2009 | Budd | .................... | G06F 11/201 710/38 |

(Continued)

*Primary Examiner* — Emerson C Puente
*Assistant Examiner* — Zhi Chen
(74) *Attorney, Agent, or Firm* — Anderson Gorecki LLP (57) ABSTRACT

First and second virtual storage controllers represent first and second physical storage controllers that provide access to different physical storage devices that back first and second virtual disks. One or more computing nodes host a virtual storage array that includes paired virtual storage directors. Each virtual storage director has access to both the first and second virtual storage controllers. Thus, the virtual disks may be presented to the storage directors as dual-ported disks even if the physical storage devices are single-ported. The virtual storage directors and virtual storage controllers may each be hosted by a separate virtual machine or instantiated in a separate container.

12 Claims, 5 Drawing Sheets

(56) References Cited

U.S. PATENT DOCUMENTS

| | | | | |
|---|---|---|---|---|
| 7,631,143 B1* | 12/2009 | Niver | G06F 3/0617 | 711/114 |
| 7,636,916 B2* | 12/2009 | Bello | G06F 3/0607 | 707/999.202 |
| 7,913,108 B1* | 3/2011 | French | G06F 11/0727 | 714/5.1 |
| 8,266,472 B2* | 9/2012 | Bose | G06F 11/2092 | 714/4.11 |
| 8,375,174 B1* | 2/2013 | Cartmell | G06F 12/0692 | 711/147 |
| 8,601,473 B1* | 12/2013 | Aron | G06F 9/45533 | 718/1 |
| 8,626,967 B1* | 1/2014 | Naik | G06F 13/14 | 710/31 |
| 8,751,878 B1* | 6/2014 | Don | G06F 11/07 | 714/55 |
| 8,819,344 B1* | 8/2014 | Faibish | G06F 3/067 | 711/147 |
| 9,619,350 B1* | 4/2017 | Ambat | G06F 11/1435 | |
| 9,715,460 B1* | 7/2017 | Krasner | G06F 9/526 | |
| 10,721,301 B1* | 7/2020 | Sampath | H04L 41/22 | |
| 2002/0188711 A1* | 12/2002 | Meyer | G06F 3/0605 | 709/223 |
| 2004/0044773 A1* | 3/2004 | Bayus | G06F 9/5027 | 709/227 |
| 2004/0148380 A1* | 7/2004 | Meyer | H04L 29/06 | 709/223 |
| 2005/0125604 A1* | 6/2005 | Williams | G06F 3/0658 | 711/112 |
| 2006/0195676 A1* | 8/2006 | Honda | G06F 3/0605 | 711/202 |
| 2011/0078334 A1* | 3/2011 | Arakawa | G06F 3/0607 | 710/3 |
| 2011/0185292 A1* | 7/2011 | Chawla | G06F 9/452 | 715/760 |
| 2012/0005668 A1* | 1/2012 | Serizawa | G06F 12/0866 | 718/1 |
| 2013/0111474 A1* | 5/2013 | Agarwal | G06F 9/45558 | 718/1 |
| 2014/0185615 A1* | 7/2014 | Ayoub | H04L 49/358 | 370/392 |
| 2016/0011929 A1* | 1/2016 | Caradonna | G06F 3/067 | 714/6.2 |
| 2016/0182310 A1* | 6/2016 | Gintis | H04L 43/0811 | 370/248 |
| 2016/0359955 A1* | 12/2016 | Gill | H04L 67/1097 | |
| 2017/0005990 A1* | 1/2017 | Birger | H04L 63/045 | |
| 2017/0034050 A1* | 2/2017 | Sunavala | H04L 45/586 | |
| 2017/0091136 A1* | 3/2017 | Hathorn | G06F 13/426 | |
| 2017/0170990 A1* | 6/2017 | Gaddehosur | H04L 12/4675 | |
| 2017/0344259 A1* | 11/2017 | Freyensee | G06F 3/061 | |

\* cited by examiner

PRESENTING VIRTUAL DISKS AS DUAL PORTED DRIVES TO A VIRTUAL STORAGE SYSTEM

BACKGROUND

Aspects of this disclosure are generally related to data storage systems that can be used to maintain relatively large data sets and support a relatively large number of concurrent users. A basic building block of a data storage system may include a storage server or a storage array. A data center may include clusters of storage servers or storage arrays. Multiple data centers may be used to implement a distributed and geographically diverse storage system.

SUMMARY

All examples, aspects and features mentioned in this document can be combined in any technically possible way.

In accordance with an aspect, an apparatus comprises: a first tangible computing node comprising: at least one tangible processor; and a tangible cache; a first tangible storage device that is accessible to the first tangible computing node via a first tangible storage controller; a second tangible storage device that is accessible to the first tangible computing node via a second tangible storage controller; a first virtual disk that is backed by the first tangible storage device; a second virtual disk that is backed by the second tangible storage device; and a first virtual storage director that is hosted by the first tangible computing node, the first virtual storage director comprising: a first virtual storage controller that represents the first tangible storage controller and provides the first virtual storage director access to the first virtual disk; and a second virtual storage controller that represents the second tangible storage controller and provides the first virtual storage director access to the second virtual disk. In some implementations the apparatus further comprises a second virtual storage director that is hosted by the first tangible computing node, the second virtual storage director comprising: a copy of the first virtual storage controller that provides the second virtual storage director access to the first virtual disk; and a copy of the second virtual storage controller that provides the second virtual storage director access to the second virtual disk. In some implementations the apparatus further comprises a first virtual machine that hosts the first virtual storage director and a second virtual machine that hosts the second virtual storage director. In some implementations the apparatus further comprises a third virtual machine that hosts the first virtual storage controller. In some implementations the apparatus further comprises a fourth virtual machine that hosts the second virtual storage controller. In some implementations the apparatus further comprises a hypervisor that manages the first virtual machine, second virtual machine, third virtual machine and fourth virtual machine. In some implementations the apparatus further comprises an active data path between the first virtual storage controller and the first virtual disk, and a protection data path between the second virtual storage controller and the second virtual disk. In some implementations the apparatus further comprises a protection data path between the copy of the first virtual storage controller and the first virtual disk, and an active data path between the copy of the second virtual storage controller and the second virtual disk. In some implementations the apparatus further comprises logic that prompts the first virtual storage director to cause the protection data path between the second virtual storage controller and the second virtual disk to become active in response to an indication that the second virtual storage director is failed. In some implementations the apparatus further comprises a second virtual storage director that is hosted by a second tangible computing node, the second virtual storage director comprising: a copy of the first virtual storage controller that provides the second virtual storage director access to the first virtual disk; and a copy of the second virtual storage controller that provides the second virtual storage director access to the second virtual disk.

In accordance with an aspect, a method comprises: with a first tangible computing node comprising: at least one tangible processor; and a tangible cache; and a first tangible storage device that is accessible to the first tangible computing node via a first tangible storage controller; and a second tangible storage device that is accessible to the first tangible computing node via a second tangible storage controller: instantiating a first virtual disk that is backed by the first tangible storage device; instantiating a second virtual disk that is backed by the second tangible storage device; and instantiating a first virtual storage director that is hosted by the first tangible computing node, comprising: representing the first tangible storage controller with a first virtual storage controller that provides the first virtual storage director access to the first virtual disk; and representing the second tangible storage controller with a second virtual storage controller that provides the first virtual storage director access to the second virtual disk. In some implementations the method further comprises the first tangible computing node hosting a second virtual storage director, the second virtual storage director comprising: a copy of the first virtual storage controller providing the second virtual storage director access to the first virtual disk; and a copy of the second virtual storage controller providing the second virtual storage director access to the second virtual disk. In some implementations the method further comprises a first virtual machine hosting the first virtual storage director and a second virtual machine hosting the second virtual storage director. In some implementations the method further comprises a third virtual machine hosting the first virtual storage controller. In some implementations the method further comprises a fourth virtual machine hosting the second virtual storage controller. In some implementations the method further comprises a hypervisor managing the first virtual machine, second virtual machine, third virtual machine and fourth virtual machine. In some implementations the method further comprises maintaining an active data path between the first virtual storage controller and the first virtual disk, and maintaining a protection data path between the second virtual storage controller and the second virtual disk. In some implementations the method further comprises maintaining a protection data path between the copy of the first virtual storage controller and the first virtual disk, and maintaining an active data path between the copy of the second virtual storage controller and the second virtual disk. In some implementations the method further comprises prompting the first virtual storage director to cause the protection data path between the second virtual storage controller and the second virtual disk to become active in response to an indication that the second virtual storage director is failed. In some implementations the method further comprises a second tangible computing node hosting a second virtual storage director, and comprising: a copy of the first virtual storage controller providing the second virtual storage director access to the first virtual disk;

and a copy of the second virtual storage controller providing the second virtual storage director access to the second virtual disk.

DETAILED DESCRIPTION

Some aspects, features and implementations described herein, including but not limited to data storage devices, computing devices, electronic components, optical components, and computer-implemented steps, may include machines and processes that are part of a complex system. Not every subsystem that may be part of such a complex system is necessarily described herein. Those of ordinary skill in the art will recognize such subsystems in view of the teachings of the present disclosure and the knowledge generally available to those of ordinary skill in the art. It will also be apparent to those of ordinary skill in the art that computer-implemented steps are stored as computer-executable instructions on a non-transitory computer-readable medium and executed on any of a variety of tangible processor devices. The machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features. For example, multiple virtual computing devices could operate simultaneously on one physical computing device. It will therefore be understood that virtual features are associated with physical features. Further, computer programs require tangible processing resources in order to function, and general purpose processing resources require computer programs in order to function. The term "logic" is used to refer to special purpose physical circuit elements and software instructions that are stored on a non-transitory computer-readable medium and implemented by general purpose tangible processors.

Figure 1:
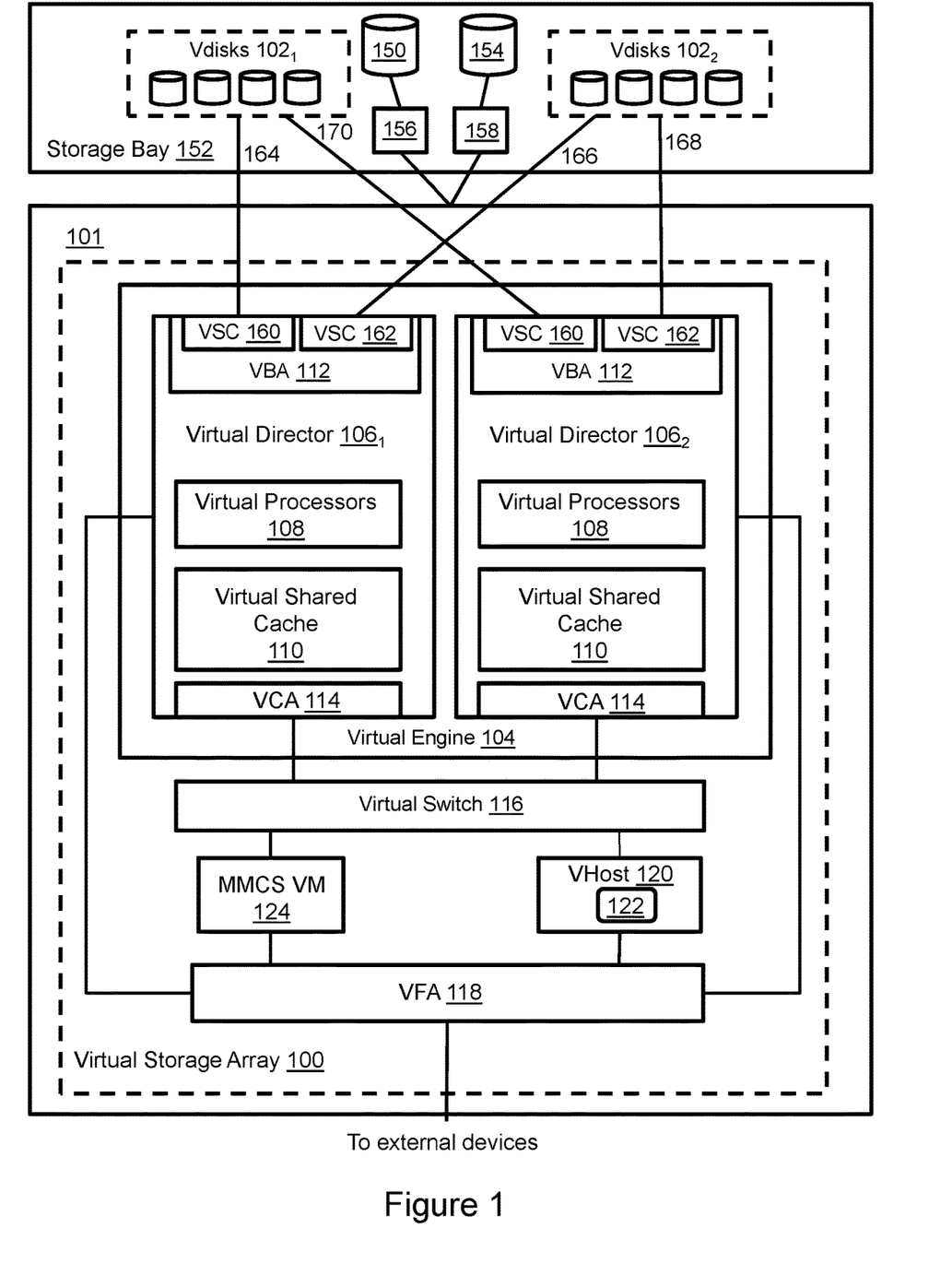
FIG. 1 illustrates a computing node that hosts a virtual storage array for which virtual disks are presented as dual ported drives.

FIG. 1 illustrates a virtual storage array 100 that runs on a tangible computing node 101. The computing node 101 is connected to physical back end storage devices 150, 154 (each of the two illustrated storage elements may represent any number of physical devices) of a storage bay 152 via respective physical disk controllers 156, 158. The virtual storage array 100 includes at least one virtual storage engine 104. Each virtual storage engine 104 includes a pair of virtual storage directors $106_1$, $106_2$. Each virtual storage director includes virtual processors 108, a virtual shared cache 110, a VBA (virtual back end adapter) 112, and a VCA (virtual channel adapter) 114, each of which may be implemented by a corresponding thread running on the tangible computing node 101. A virtual switch 116 may provide point-to-point connectivity between the virtual storage directors $106_1$, $106_2$, and also between the virtual storage directors $106_1$, $106_2$ and other virtual storage directors hosted by different tangible computing nodes. The virtual switch 116 may be implemented, for example and without limitation, as a virtual Fibre Channel or Ethernet switch. A VFA (virtual front end adapter) 118 is configured to interface the virtual storage directors $106_1$, $106_2$ with devices that are external to the storage array, e.g. hosts. The VFA also interconnects the virtual directors with a virtual host 120 running as a guest OS including a hosted application 122, and a MMCS VM (management module control station virtual machine) 124. The MMCS VM is also reachable via the virtual switch 116.

Figure 2:
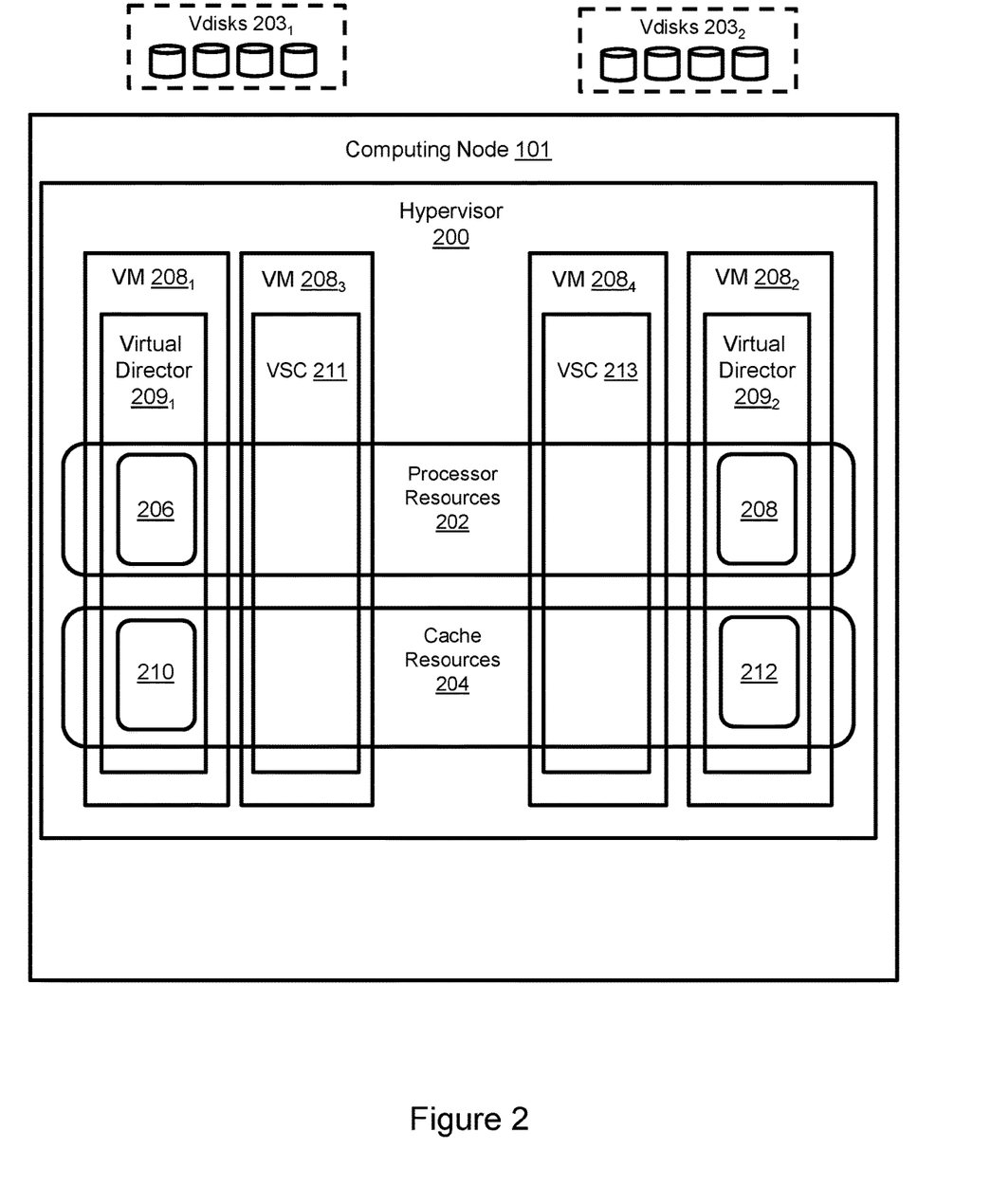
FIG. 2 illustrates allocation of computing node resources to virtual storage directors of the virtual storage array.

Referring to FIG. 2, a hypervisor 200 and VMs (virtual machines) running on tangible computing node 201 manages sharing of tangible processor resources 202 and tangible cache resources 204 of the computing node 201. For example, virtual processor resources 206, 208 may include cores of corresponding CPUs and GPUs of the tangible processor resources 202 of the computing node 201 that are allocated to the respective VMs $208_1$, $208_2$ for use by the hosted virtual storage directors $209_1$, $209_2$. Virtual shared cache resources 210, 212 may include portions of the tangible cache resources 204 of the computing node 201 that are allocated to the respective VMs $208_1$, $208_2$ for use by the hosted virtual storage directors. Each virtual storage director $209_1$, $209_2$ may be a type of Guest OS running on a respective VM $208_1$, $208_2$ that is managed by the hypervisor 200. Although a hypervisor with VMs is shown, containers could be used and are considered to be an equivalent feature.

Referring again to FIG. 1, the virtual storage array 100 emulates operation of a physical storage array on the computing node 101. The VBAs 112 interface with groups of virtual disks $102_1$, $102_2$ that are backed, respectively, by the back end storage devices 150, 154 in support of IOs and other functions. From the perspective of the virtual storage directors $106_1$, $106_2$, the virtual disks $102_1$, $102_2$ are physical storage devices that can be accessed with protocol commands, e.g. and without limitation SCSI commands. However, the data that apparently resides on the virtual disks from the perspective of the virtual storage directors actually resides on the back end storage devices 150, 154. The virtual processors 108 run a variety of threads that are configured to cause the virtual storage directors $106_1$, $106_2$ to perform IOs and other functions, e.g. by accessing the virtual disks. The virtualized shared cache 110 includes a cache slots section that is allocated for temporarily storing data that is being written to or read from the storage bay via the VBA 112. Each VCA 114 may include one or more virtual ports, e.g. and without limitation, a pair of virtual Ethernet ports, via which other virtual directors of the same or other virtual storage engines of the same virtual storage array can be reached via the virtual switch 116. Each virtual storage director can access the virtualized shared memory of its paired virtual storage director via the VCAs using DMA (direct memory access). Data that is being written by an external or virtual host device is initially copied to the virtual shared cache 110 and subsequently destaged to the storage bay 152. Data that is being read by an external host device or virtual host device is copied from the storage bay to virtual shared cache 110 via the VBA and then provided to the external host or virtual host via the VFA. The VFA also helps to present a logical storage device to external hosts and virtual hosts, receives IO requests from application instances 122, and provides data to external hosts and virtual hosts in response to read requests. Data may be also copied to the virtual shared cache from the back end storage devices in response to a hint.

Referring to FIG. 1, each VBA 112 includes at least two virtual storage controllers 160, 162. Virtual storage controller 160 represents physical storage controller 156, and virtual storage controller 162 represents physical storage controller 158. For example, and without limitation, the physical storage controllers and associated storage devices may include single-ported physical storage devices with integrated SCSI controllers, and the virtual storage controllers may communicate with their physical storage controller counterparts using the SCSI protocol. From the perspective of the virtual storage director the virtual storage controllers are equivalent to physical storage controllers. Referring again to FIG. 2, virtualization enables both virtual storage directors $209_1$, $209_2$ to access instances of both virtual storage controllers 211, 213 with each virtual storage controller 211, 213 implemented in a separate respective virtual machine $208_3$, $208_4$ on the computing node 201. The hypervisor presents the virtual disks $203_1$, $203_2$ to each of the virtual machines $208_3$, $208_4$ as raw SCSI devices. The virtual storage array configures the devices as dual ported, shared SCSI drives that are accessible via the virtual storage controllers. Thus, the virtual disks $203_1$, $203_2$ are presented as dual ported drives, which may provide advantages over the alternative of virtualizing the disk subsystem within the virtual storage directors, e.g., running both the virtual storage controller and virtual director within a single virtual machine.

Figure 3:
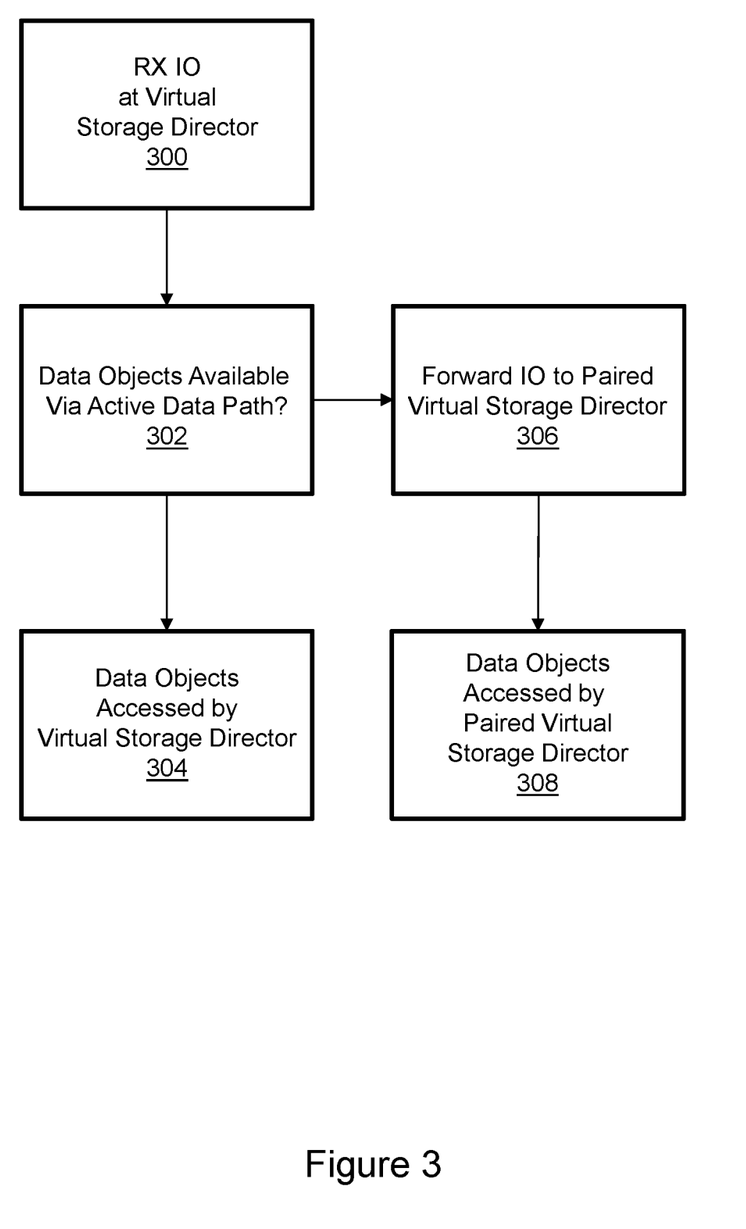
FIG. 3 illustrates operation of the virtual storage array under normal conditions.

Referring to FIGS. 1 and 3, each virtual storage controller supports a data path between the virtual storage director with which it is associated and one of the virtual disks. In the illustrated example data path 164 associates virtual director $106_1$ with virtual disks $102_1$, data path 166 associates virtual director $106_1$ with virtual disks $102_2$, data path 168 associates virtual director $106_2$ with virtual disks $102_1$, and data path 170 associates virtual director $106_2$ with virtual disks $102_1$. For each virtual storage director, one of the data paths may be implemented as a primary data path and one of the data paths may be implemented as a protection (failover) data path. For example, data paths 164 and 168 may be primary data paths and data paths 166 and 170 may be protection data paths. In normal operation when an IO is received by a virtual storage director as indicated in block 300, the virtual storage director determines whether the data objects associated with the 10 are available via the active data path as indicated in block 302. If the data objects are available via the active data path then the data objects are accessed by the virtual storage director as indicated in block 304, i.e. accessed by the virtual storage director that received the 10 in block 300. If it is determined in block 302 that the data objects are not available via the active data path, but are available via the protection data path, then the IO is forwarded to the paired virtual storage director as indicated in block 306, e.g. forwarded to the other virtual storage director in the storage engine via the virtual switch. The data objects are then accessed by the paired virtual storage director via its active data path as indicated in block 308. Each virtual storage director may maintain metadata and mappings for both groups of virtual disks that indicate, among other things, which virtual storage director has access to specific data objects via an active data path.

Figure 4:
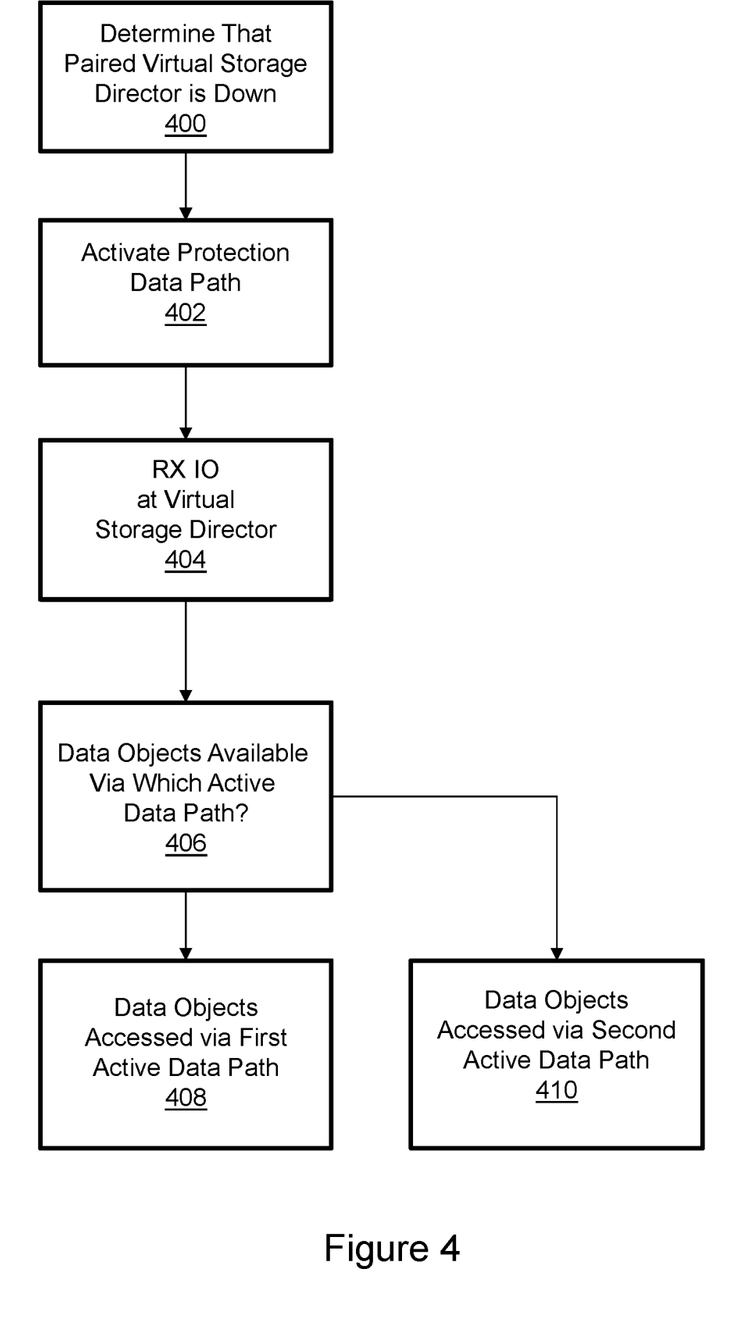
FIG. 4 illustrates operation of the virtual storage array under failover conditions.

Referring now to FIGS. 1 and 4, a failover mode is implemented when a virtual storage director determines that its paired virtual storage director is failed, e.g. non-operational, as indicated in block 400. The paired virtual storage directors of a virtual storage engine may exchange periodic messages to indicate continued operational status, and the absence of such a message for some predetermined period of time may indicate non-operational status. In response to detecting that its paired storage director is failed, the operational virtual storage director activates its protection data path as indicated in block 402. When the operational virtual storage director receives an IO as indicated by block 404, the virtual storage director determines which data path is associated with the data objects required to service the IO as indicated in block 406. Based on that determination the data objects are either accessed via the first active data path (normally active data path) as indicated in block 408 or accessed via the second active data path (activated protection data path) as indicated in block 410. For example, if virtual storage director $106_2$ is failed then the first and second active data paths would be data paths 164 and 166, respectively. Both virtual storage directors have metadata associated with the entire data mapping for both sets of virtual disks. The virtual storage engine reverts to normal operation when the paired virtual storage director is no longer failed.

Figure 5:
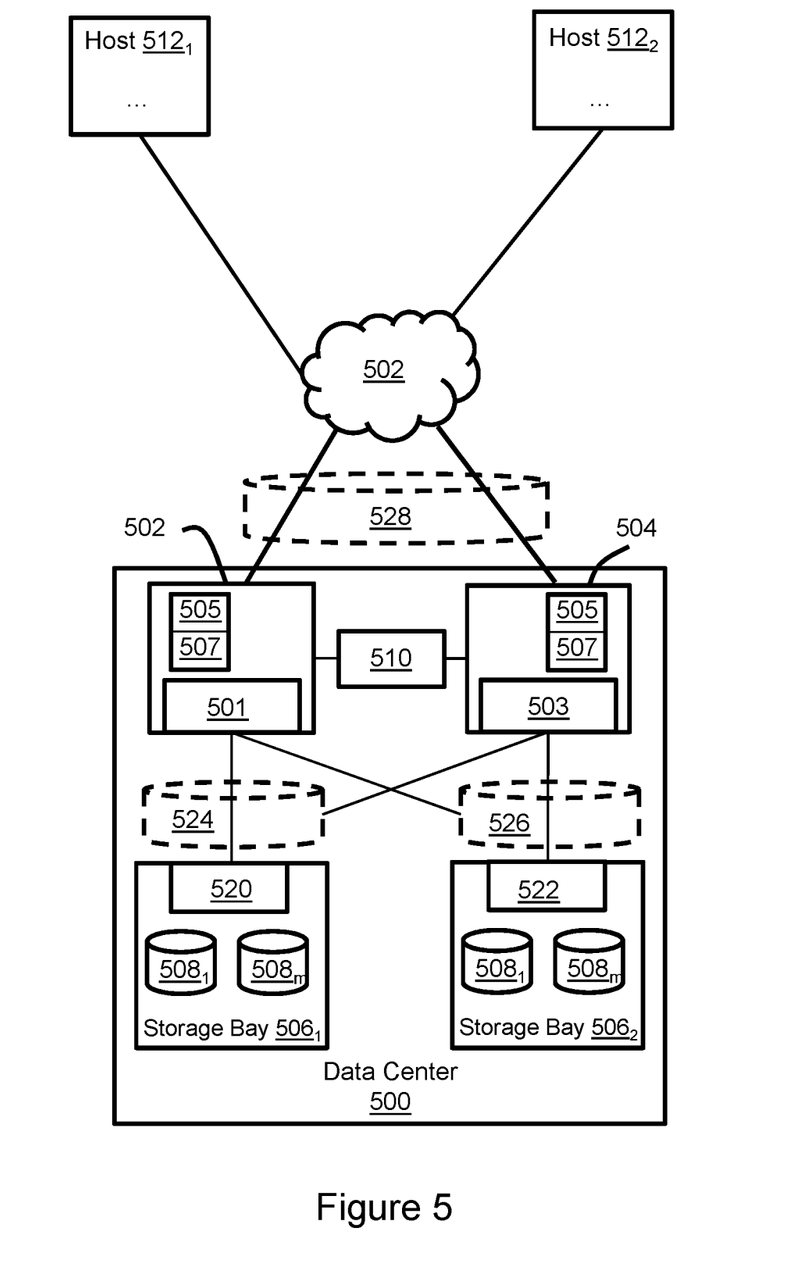
FIG. 5 illustrates a data center based on multiple computing nodes that host a distributed virtual storage array for which virtual disks are presented as dual ported drives.

FIG. 5 illustrates a data center 500 based on separate tangible computing nodes 502, 504 that host virtual storage directors 501, 503 respectively. The virtual storage directors are part of the same storage engine and distributed virtual storage array for which virtual disks 524, 526 are presented as dual ported drives. Hosts $512_1$, $512_2$ are connected to the data center via a network 502. For context and without limitation the network 502 could be a WAN (wide area network) or MAN (metropolitan area network). The data center 500 includes at least two computing nodes 502, 504. The hosts and computing nodes may be servers or special purpose hardware platforms, e.g., mounted in racks or in a chassis, for example and without limitation. Each computing node includes tangible processor resources 505 and tangible memory resources 507. For context and without limitation, the processor resources may include one or more multi-core processors including CPUs and GPUs, and the memory resources may include volatile memory components such as RAM (random access memory) chips. The computing nodes are interconnected via point-to-point communication links, a switch, or a fabric, represented as element 510. Each computing node is associated with a corresponding storage bay $506_1$-$506_2$. Each storage bay includes tangible data storage devices $508_1$-$508_m$ that are accessible to the computing nodes via storage controllers 520, 522. The tangible data storage devices are used to present virtual disks 524, 526 that are used to present a production volume 528 to the hosts. Each virtual storage director 501, 503 includes at least two virtual storage controllers that represent the physical storage controllers 520, 522. Each virtual storage controller is implemented in a separate respective virtual machine on each computing node. A hypervisor presents virtual disks 524, 526 to each virtual machine as raw SCSI devices. The virtual storage array configures the devices as dual ported, shared SCSI drives. Thus, the virtual disks 524, 526 are presented as dual ported drives.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
   a first tangible computing node comprising:
      at least one tangible processor; and
      a tangible cache; and
   a first single-ported tangible storage device that is accessible to the first tangible computing node via a first tangible disk controller that is integrated in a storage bay having the first single-ported tangible storage device, wherein a first dual-ported virtual disk is backed by the first single-ported tangible storage device; and
   a virtual storage array running on the first tangible computing node, wherein:
      a first virtual back-end storage director is hosted by the first tangible computing node, the first virtual storage back-end director accessing an instance of a first virtual storage controller that represents the first tangible disk controller in response to commands from a host the instance of the first virtual storage controller configured to provide the first back-end virtual storage director access to the first dual-ported virtual disk, and thus access to the first single-ported tangible storage device; and
      a second virtual back-end storage director is hosted by the first tangible computing node, the second virtual back-end storage director accessing the instance of the first virtual storage controller in response to commands from the host the instance of the first virtual storage controller configured to provide the second virtual back-end storage director access to the first dual-ported virtual disk, and thus access to the first single-ported tangible storage device, wherein the first virtual storage controller is separate from the first virtual back-end storage director and the second virtual back-end storage director;
      whereby the first single-ported tangible storage device exhibits dual port accessibility by being accessed by both the first virtual back-end storage director and the second virtual back-end storage director via the instance of the first virtual storage controller.

2. The apparatus of claim 1 further comprising:
   a second single-ported tangible storage device that is accessible to the first tangible computing node via a second tangible disk controller that is integrated in the storage bay having the second single-ported tangible storage device;
   a second dual-ported virtual disk that is backed by the second single-ported tangible storage device; and
   an instance of a second virtual storage controller that represents the second tangible disk controller and provides the first virtual back-end storage director access to the second dual-ported virtual disk and provides the second virtual back-end storage director access to the second dual-ported virtual disk, wherein the second virtual storage controller is separate from the first virtual back-end storage director and the second virtual back-end storage director.

3. The apparatus of claim 1 comprising a first virtual machine that hosts the first virtual back-end storage director and a second virtual machine that hosts the second virtual back-end storage director.

4. The apparatus of claim 3 comprising a third virtual machine that hosts the first virtual storage controller.

5. The apparatus of claim 4 comprising a fourth virtual machine that hosts the second virtual storage controller.

6. The apparatus of claim 5 comprising a hypervisor that manages the first virtual machine, second virtual machine, third virtual machine and fourth virtual machine.

7. A method for generating a virtual storage array, comprising:
   with a first tangible computing node comprising at least one tangible processor and a tangible cache, and a first single-ported tangible storage device that is accessible to the first tangible computing node via a first tangible disk controller that is integrated in a storage bay having the first single-ported tangible storage device:
      instantiating a first dual-ported virtual disk that is backed by the first single-ported tangible storage device;
      instantiating a first virtual back-end storage director and a second virtual back-end storage director that are hosted by the first tangible computing node;
      representing the first tangible disk controller with an instance of a first virtual storage controller, wherein the first virtual storage controller is separate from the first virtual back-end storage director and the second virtual back-end storage director;
      using the instance of first virtual storage controller to provide the first virtual back-end storage director access to the first dual-ported virtual disk, and thus access the first single-ported tangible storage device, in response to commands from a host; and
      using the instance of the first virtual storage controller to provide the second virtual back-end storage director access to the first dual-ported virtual disk, and thus access the first single-ported tangible storage device, in response to commands from the host;
      whereby the first single-ported tangible storage device exhibits dual port accessibility by being accessed by both the first virtual back-end storage director and the second virtual back-end storage director via the instance of the first virtual storage controller.

8. The method of claim 7 wherein a second tangible storage device is accessible to the first tangible computing node via a second tangible disk controller that is integrated in the storage bay having the second single-ported tangible storage device, and further comprising:
   instantiating a second dual-ported virtual disk that is backed by the second tangible storage device, wherein the second virtual storage controller is separate from the first virtual back-end storage director and the second virtual back-end storage director;
   representing the second tangible storage controller with an instance of a second virtual storage controller that provides the first virtual back-end storage director access to the second dual-ported virtual disk and provides the second virtual back-end storage director access to the second dual-ported virtual disk.

9. The method of claim 7 comprising a first virtual machine hosting the first virtual back-end storage director and a second virtual machine hosting the second virtual back-end storage director.

10. The method of claim 9 comprising a third virtual machine hosting the first virtual storage controller.

11. The method of claim 10 comprising a fourth virtual machine hosting the second virtual storage controller.

12. The method of claim 11 comprising a hypervisor managing the first virtual machine, second virtual machine, third virtual machine and fourth virtual machine.

* * * * *